United States Patent
Tian et al.

(10) Patent No.: US 12,005,890 B2
(45) Date of Patent: Jun. 11, 2024

(54) COLUMN ASIL CIRCUIT FOR MULTIPLE BITLINES IN AN IMAGE SENSOR

(71) Applicant: OmniVision Technologies, Inc., Santa Clara, CA (US)

(72) Inventors: Zhenfu Tian, San Jose, CA (US); Liang Zuo, Milpitas, CA (US); Yan Li, San Jose, CA (US); Wen He, San Jose, CA (US); Satoshi Sakurai, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 147 days.

(21) Appl. No.: 17/711,836

(22) Filed: Apr. 1, 2022

(65) Prior Publication Data

US 2023/0311859 A1  Oct. 5, 2023

(51) Int. Cl.
*H04N 7/18*  (2006.01)
*B60W 30/09*  (2012.01)
*B60W 50/14*  (2020.01)
*G01S 13/931*  (2020.01)

(52) U.S. Cl.
CPC ............ *B60W 30/09* (2013.01); *B60W 50/14* (2013.01); *G01S 13/931* (2013.01); *B60W 2420/403* (2013.01)

(58) Field of Classification Search
CPC .. B60W 30/09; B60W 50/14; B60W 2420/42; H04N 7/18; H04N 3/14; G01S 13/931
USPC .......................................................... 348/148
See application file for complete search history.

(56) References Cited

U.S. PATENT DOCUMENTS

| | | | | |
|---|---|---|---|---|
| 8,772,695 | B2* | 7/2014 | Storm | H04N 25/46 |
| | | | | 348/308 |
| 9,131,211 | B2* | 9/2015 | Johnson | H04N 17/002 |
| 10,044,948 | B2 | 8/2018 | Deng et al. | |
| 10,827,143 | B2 | 11/2020 | Ebihara | |
| 2010/0027657 | A1 | 2/2010 | Kadono et al. | |
| 2010/0276574 | A1* | 11/2010 | Manabe | H04N 25/60 |
| | | | | 250/214 A |
| 2021/0067714 | A1 | 3/2021 | Wang et al. | |
| 2021/0258563 | A1* | 8/2021 | Zhan | H04N 5/33 |
| 2022/0266845 | A1* | 8/2022 | Lee | B60W 50/0205 |

OTHER PUBLICATIONS

Axmann et al., "Advanced methods for safe visualization on automotive displays", Journal of the Society for Information Display, Apr. 2, 2020, pp. 483-498.

\* cited by examiner

*Primary Examiner* — Trang U Tran
(74) *Attorney, Agent, or Firm* — COZEN O'CONNOR

(57) ABSTRACT

A failure detection circuit for an image sensor includes a first input node, an array of second input nodes, and an output stage. The first input node is coupled to a reference voltage. The array of second input nodes has each input node coupled to receive a signal from a bitline of a bitline array in an image sensor that includes an array of pixels with each pixel is coupled to at least one bitline of the bitline array. The output stage is coupled to generate an output voltage indicative of any of the second input nodes being lower than the reference voltage.

11 Claims, 6 Drawing Sheets

COLUMN ASIL CIRCUIT FOR MULTIPLE BITLINES IN AN IMAGE SENSOR

BACKGROUND

Increasingly, modern vehicles are equipped with advanced driver assistance system (ADAS). ADAS can enhance comfort and safety features in operating a vehicle, such as collision warning, proximity warning, and blind spot warning. ADAS can also include active autonomous components for an additional level of driving safety, such as adaptive cruise control, automatic braking, automatic steering, and collision avoidance. While ADAS relies on and processes inputs from multiple data sources, such as light detection and ranging (LIDAR), radar, and computer vision, the primary sensor in most ADAS remains the image sensor. As ADAS progresses to include more active and autonomous features, vehicle safety depends more on the reliability of the imaging system.

For automotive image sensor design, there are standards for meeting the requirements for automotive safety integrity level (ASIL). ASIL designates safety levels in automotive industry and has a risk classification scheme defined by ISO26262. ASIL is established by examining the risk associated with a potential hazard by analyzing severity of a failure, the probability of a failure occurring, and the ability of the effect of the failure to be controlled. There are four levels of ASIL identified by the standard: ASIL A, ASIL B, ASIL C, ASIL D. ASIL D denotes the highest integrity requirements on the product while ASIL A denotes the lowest requirements. For image sensors, to meet the requirements of ASIL D standard, each individual circuit block should have a detection mechanism for detecting operational failures that include (i) signal stuck low/high, (ii) signal transient fault, and (iii) under-voltage/over-voltage. Failure to detect such faults may lead to image quality degradation/image corruption, which, for automotive applications, can cause safety concerns.

SUMMARY

Image sensors include an array of pixels, each of which includes one or more photodiodes that generate image charge in response to incident light. The image charge is transferred from the photodiode to floating diffusion and onto a readout circuit, when triggered, through bitlines. Certain embodiments of the present disclosure have dual bitlines for each pixel. Traditional approach for failure detection in a column of pixels may include a failure detection circuit for each bitline. For dual bitlines, additional failure detection circuits require more space and power than the traditional one bitline per pixel design. Present disclosure describes a failure detection circuit that includes more than one bitline input without requiring additional space and power.

In a first aspect, a failure detection circuit for an image sensor includes a first input node, an array of second input nodes, and an output stage. The first input node is coupled to a reference voltage. The array of second input nodes has each input node coupled to receive a signal from a bitline of a bitline array in an image sensor that includes an array of pixels with each pixel is coupled to at least one bitline of the bitline array. The output stage is coupled to generate an output voltage indicative of any of the second input nodes being lower than the reference voltage.

In a second aspect, a method for detecting a failure in a bitline includes (i) receiving an array of input voltages with each input voltage received from a respective bitline of a bitline array; (ii) comparing each input voltage of the received array of input voltages with a reference voltage for generating a comparison result; and (iii) outputting a combined result from an OR gate with each input corresponding to the generated comparison result for each input voltage.

DETAILED DESCRIPTION

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meanings.

Terms such as "first", "second", and "third" are used in this specification to avoid confusion among components and do not limit the order or the like. Therefore, for example, the term "first" can be replaced with the term "second", "third", or the like as appropriate. Additionally, when the descriptions below involve drawings, like numerals in different drawings represent like or similar elements unless otherwise indicated.

Figure 1:
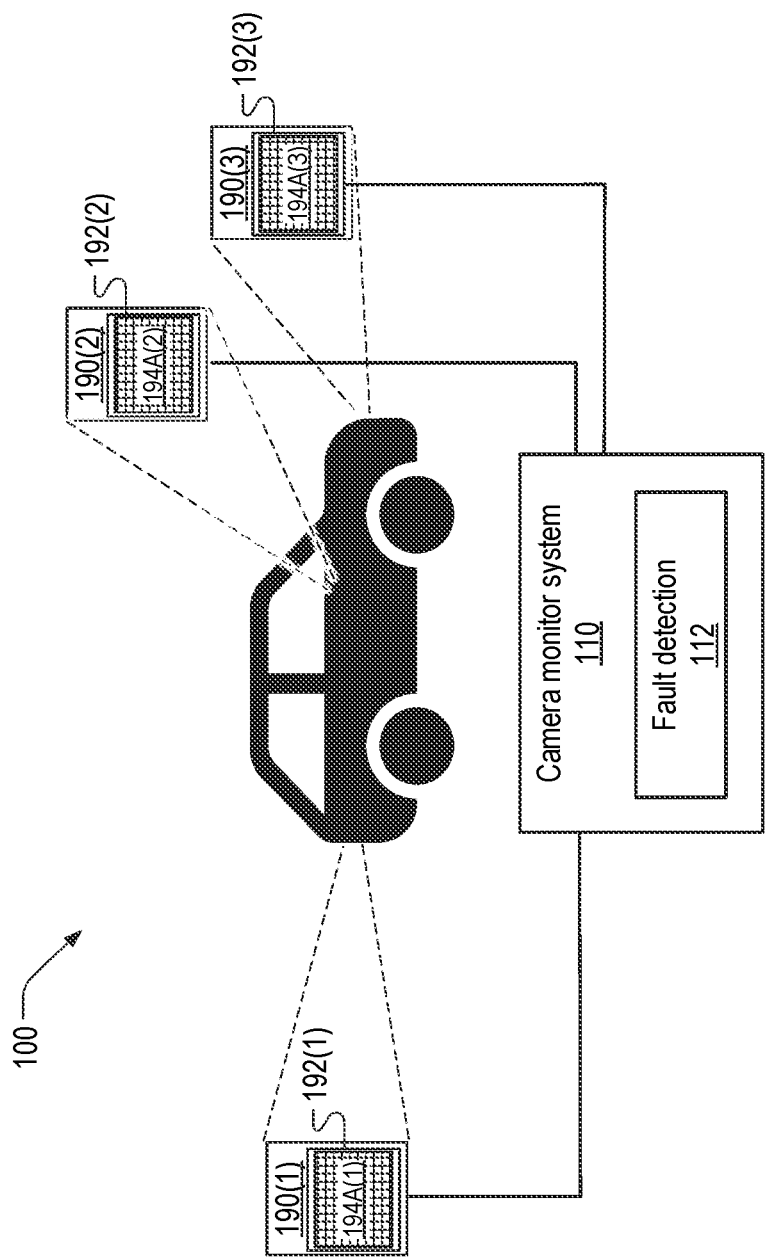
FIG. 1 illustrates a vehicle safety system, in an embodiment.

FIG. 1 depicts an example vehicle safety system 100. Vehicle safety system 100 may be a part of ADAS. Vehicle safety system 100 includes a plurality of cameras 190. Cameras 190 may be distributed around the vehicle, such that each camera has a different perspective of the environment around the vehicle. For example, camera 190(1) may be a rear-view camera mounted in the back of the vehicle, while camera 190(2) may be a lane-tracking camera mounted on a side of the vehicle. Camera 190 includes an image sensor 192, which includes a pixel array 194A. Image sensor 192 may be part of a chip-scale package or a chip-on-board package. Image sensor 192 is shown as a component of a vehicle camera, but it should be appreciated that other devices, such as security devices, drone cameras, etc. may utilize image sensor 192 without departing from the scope hereof.

Vehicle safety system 100 also includes a camera monitor system (CMS) 110. CMS 110 is configured to receive a failure flag from each camera 190 and includes a fault detection flag 112, which is set when a fault is detected in any of the cameras 190. Fault detection flag 112 may trigger an alert for the vehicle's occupant, which may be in a form of a warning light and can additionally disable a part of ADAS. Failure flag from a camera 190 can be generated by image sensor 192 as discussed below.

Figure 2:
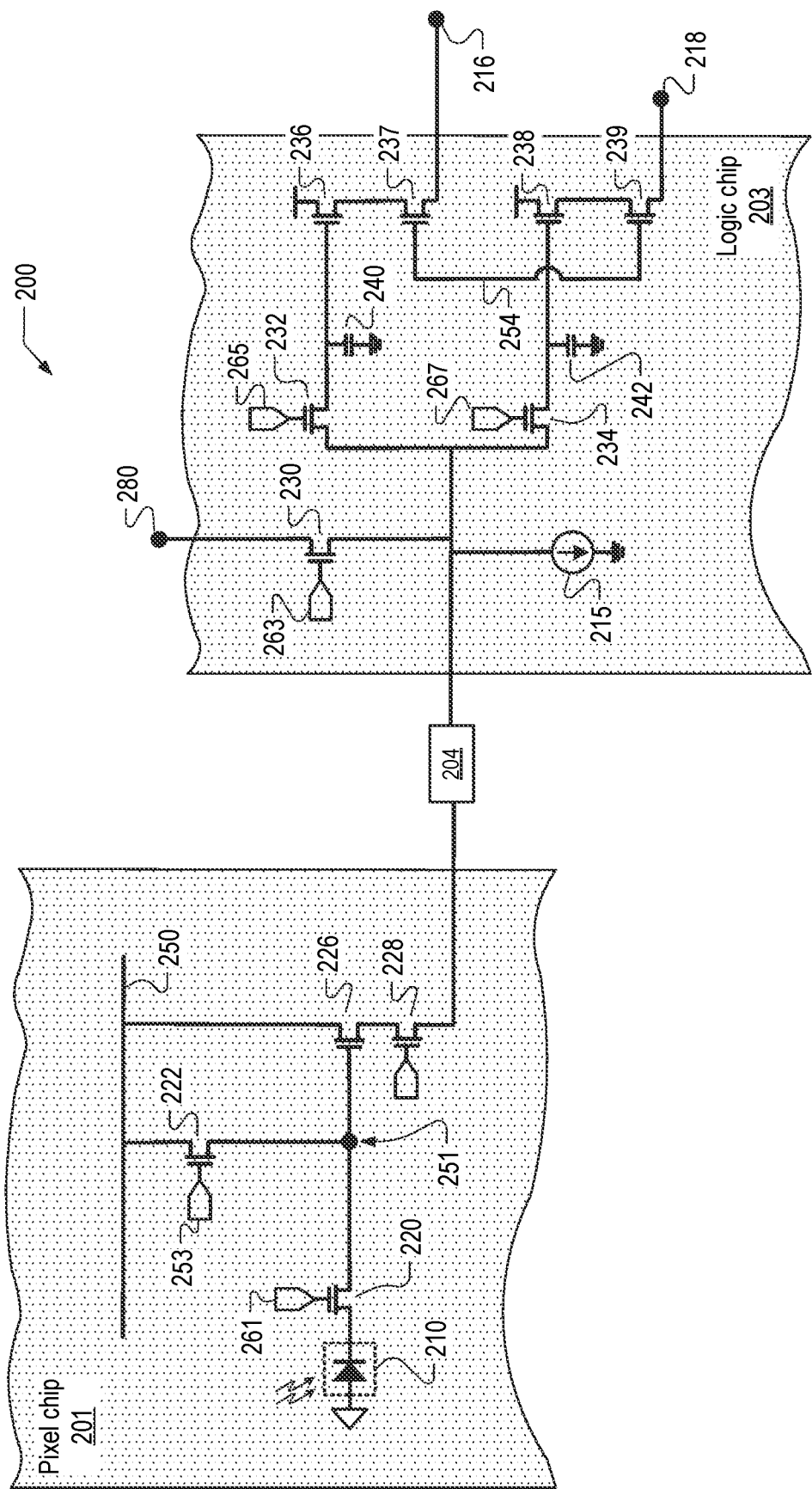
FIG. 2 illustrates a schematic of a pixel, in an embodiment.

FIGS. 2A and 2B show an example schematic of a pixel 200. Pixel 200 is an example of pixels that form pixel array 194A. Pixel 200 may be part of a global shutter image sensor. In certain embodiments, image sensor, such as image sensor 192 includes a pixel chip 201 and a logic chip 203. Pixel 200 may include parts in both pixel chip 201 and logic chip 203. For example, pixel 200 may include one or more of photodiodes 210 and one or more of transistors: a transfer (TX) transistor 220, a reset (RST) transistor 222, a source-follower (SF) transistor 226, and a gate selection (GS) transistor 228 in pixel chip 201. Pixel 200 may also include one or more of transistors: a load transistor 230, sample and hold switches 232 and 234, SF transistors 236 and 238, and row-select (RS) transistors 237 and 239 in logic chip 203. Pixel chip 201 and logic chip 203 may be connected by a hybrid bond (HB) 204.

In operation, the image charge from photodiode 210 is connected to a floating diffusion (FD) node 251 by TX transistor 220, which is controlled by a TX selection line 261. FD node 251 may be connected to a reset voltage power line 250, such as power line for analog circuit (AVDD), through RST transistor 222, which selectively can reset photodiode 210 to a predefined reset level such as AVDD. RST transistor 222 may be controlled by an RST control signal 253. FD node 251 also controls SF transistor 226. SF transistor 226 is coupled in series with GS transistor 228, which couples to logic chip 203 via HB 204. In certain embodiments, HB 204 is coupled to load transistor 230 and a pixel bias current source 215 in logic chip 203. Load transistor 230 is controlled by a Vctrl_en signal 263 and is coupled to a voltage reference (Vref) 280.

In some global shutter designs, sample and hold switches are used to sample and hold signal (SHS) readings and sample and hold reset (SHR) readings from the image sensor. SHS and SHR switches are controlled to sample respective signal and reset levels. In operation, during a global sampling phase, all sample and hold switches toggle at the same time to sample the whole frame from the image sensor into storage capacitors. When the global sampling is completed, a row-by-row data is read out and reset and signal levels are digitized. For example, a first sample and hold switch 232 is controlled by sample and hold reset enable (SHR_en) signal 265 to sample and hold the reset level from FD node 251 into a first storage capacitor (C1) 240. A second sample and hold switch 234 is controlled by sample and hold signal enable (SHS_en) signal 267 to sample and hold the signal level from FD node 251 into a second storage capacitor (C2) 242.

The first terminal of C1 240 controls an SF transistor 236, and C2 242 controls an SF transistor 238. SF transistors 236 and 238 are coupled in series with RS transistors 237 and 239, respectively. RS transistors 237 and 239 are controlled by a row-select signal 254. After a shutter operation, reset and signal readings stored in respective capacitors C1 240 and C2 242 are readout in rolling shutter mode row-by-row to a column readout circuit. For example, image charge stored in C1 240 may be transferred to a first data bitline through a connection point 216 using transistors 236 and 237. Likewise, image charge stored in C2 242 may be transferred to a second data bitline through a connection point 218 using transistors 238 and 239.

The control signals for transistors may be provided by control circuit to control the operation of any pixel in order to reset the pixel and to read out the image charge from one or more photodiodes 210. Pixel configurations are not limited to the example shown in FIG. 2. For example, one or more photodiodes may share the same FD node, RST transistor, SF transistors and RS transistors.

Figure 3:
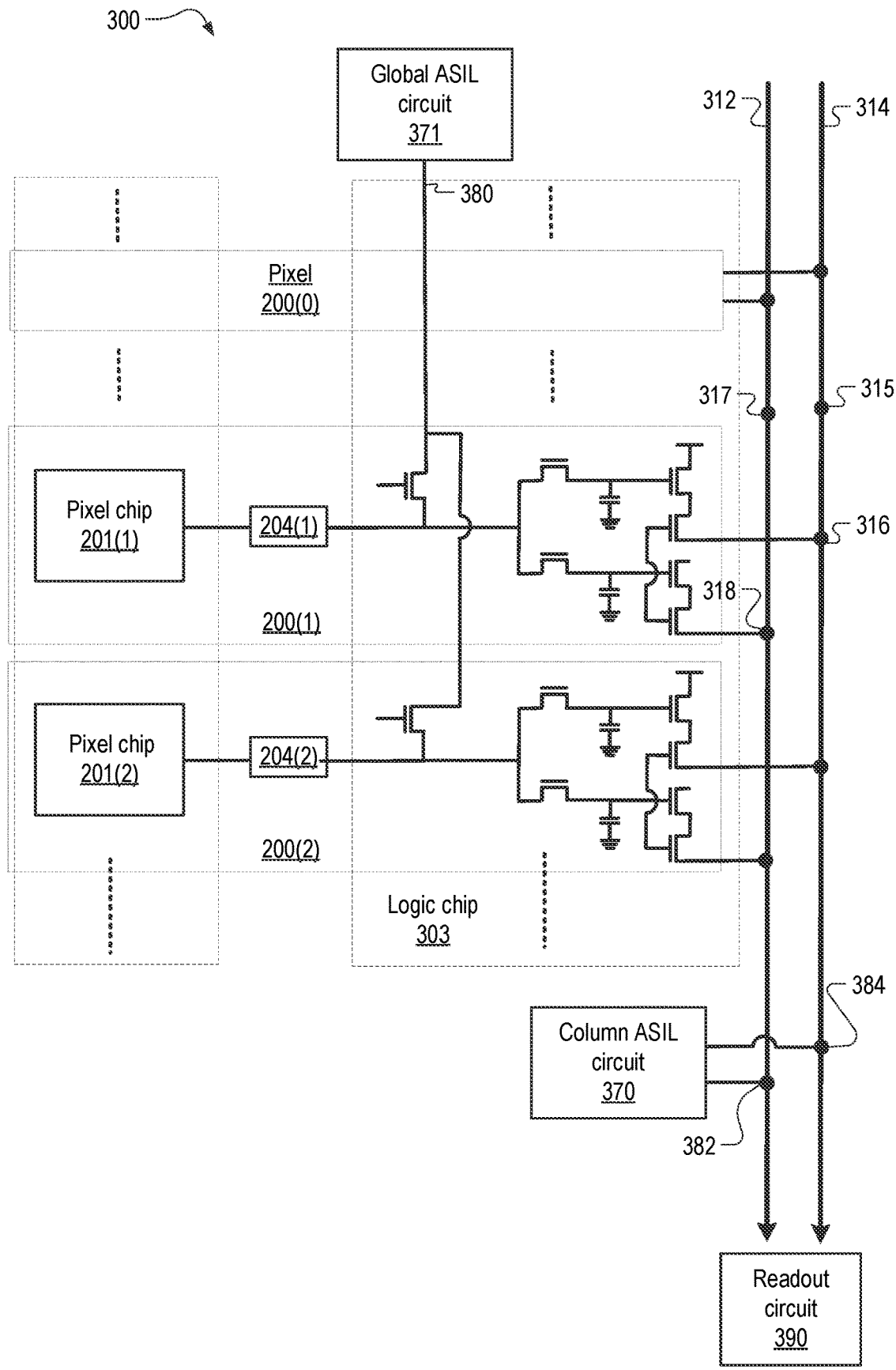
FIG. 3 illustrates a simplified schematic of an image sensor column showing failure detection circuits, in an embodiment.

FIG. 3 is a simplified schematic diagram of an image sensor column 300. An image sensor, such as image sensor 192, may include an array of image sensor columns 300. Image sensor column 300 includes an array of pixels 200 and column bitlines 312 and 314. Image sensor column 300 may also include a readout circuit 390. Readout circuit 390 is coupled to one or more bitlines including bitlines 312 and 314 and may convert the image charge from the array of pixels into an image data by using the digitized difference between the sampled reset and signal levels.

Image sensor column 300 may also include a global failure detection circuit, or Global ASIL circuit 371. Global ASIL circuit 371 may be coupled to a load transistor (e.g., load transistor 230) in each pixel by sampling a Vref 380, which is an example of Vref 280. Global ASIL circuit 371 can detect failures in each pixel circuit, such as pixel 200 in image sensor column 300, including a broken HB 204 and transistor inputs stuck low or high for transistors 222 and 228. For example, if any of transistors 222 and 228 is stuck low when the transistors are set high, pixel bias current from pixel bias current source 215 flows through load transistor 230 by setting Vctrl_en 263 to a certain low level and thus generating a fault signal. It is important in this example that the level set for Vctrl_en 263 for failure detection does not interfere with normal pixel operation. Likewise, for an open circuit HB 204, pixel bias current from pixel bias current source 215 flows thru load transistor 230 and also generates a fault signal by Global ASIL circuit 371.

Image sensor column 300 also includes a column ASIL circuit 370. Column ASIL circuit 370 is coupled to one or more of column bitlines, such as bitlines 312 and 314 with respective coupling points 382 and 384. Column ASIL circuit 370 can detect failures that may be present in the bitlines. For example, two types of failures can be present in the bitlines: (i) disconnection in one or more bitlines and (ii) disconnection of one or more pixels to one or more bitlines. In failure (i), if a bitline becomes open, for example at a disconnect point 317 or 315, all pixel connections including pixel 200(0), above the disconnect points 317 or 315 may fail. In failure (ii), one or more row-select connections, such as connection points 316 and 318 which are respective examples of connection points 216 and 218, become open. Any mode of failure causes column ASIL circuit 370 to issue a failure flag. As the pixels are read out row-by-row, the physical location of the open connection is unique, and the failed connection location is readily available.

Figure 4:
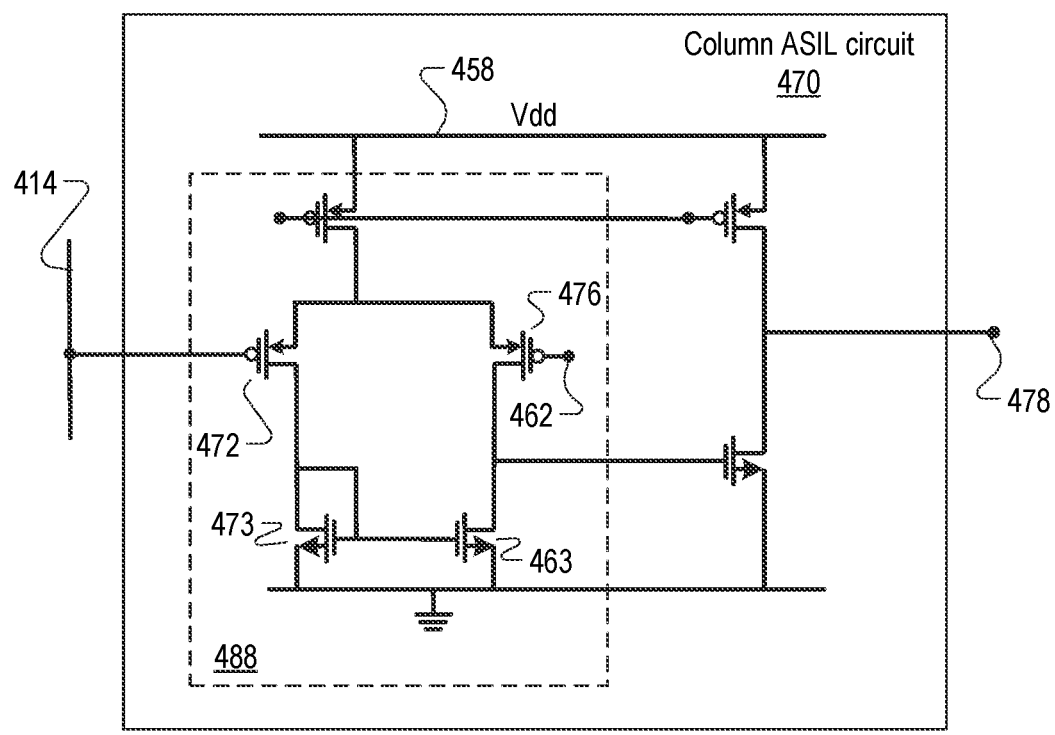
FIG. 4 illustrates a schematic of a failure detection circuit for a bitline, in an embodiment.

FIG. 4 is an example schematic of a column ASIL circuit 470. Column ASIL circuit 470 includes a comparator 488, which includes a first input device 476 that is coupled to a Vref 462. FIG. 4 denotes a power line (Vdd) 458. Comparator 488 also includes a second input device 472 that has a gate terminal coupled to bitline 414. Bitline 414 is an example of either bitlines 312 or 314. In the depicted example, first and second input devices 476 and 472 are PMOS transistors. In another example, first and second input devices 476 and 472 may be NMOS transistors. An NMOS current mirror including transistors 463 and 473 is coupled to respective input devices 476 and 472. Column ASIL circuit 470 also includes an output (ASIL_fail) node 478, which may couple the output of the failure detection circuit to an asynchronous static random-access memory (AS-RAM) in a readout circuit such as readout circuit 390. In operation, when the voltage on bitline 414 falls below Vref 462, ASIL_fail node 478 is set high, indicating a failure.

Figure 5:
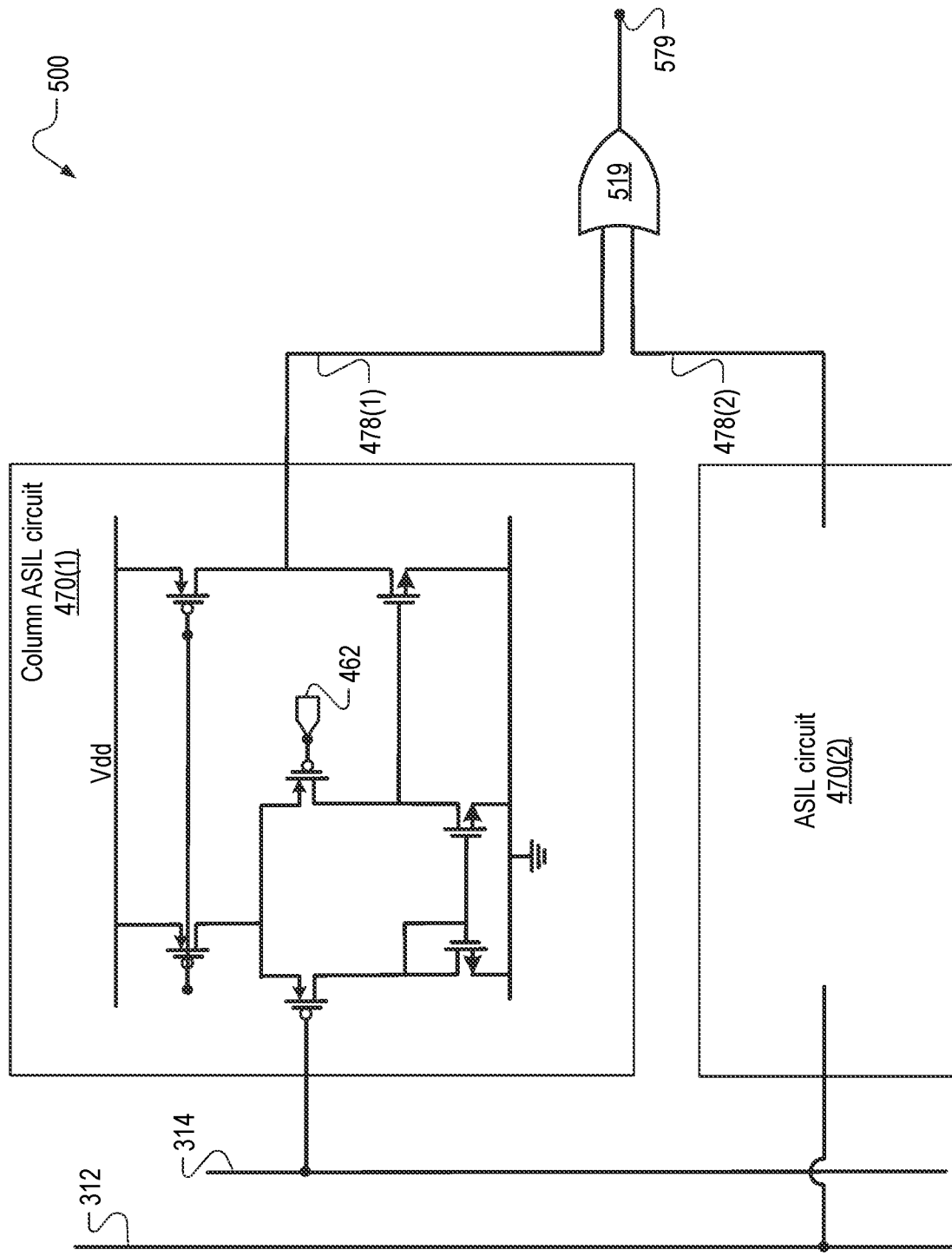
FIG. 5 illustrates a simplified schematic of failure detection circuits for a dual-bitlines, in an embodiment.

FIG. 5 is an example schematic of a dual-bitline column ASIL circuit 500, column ASIL circuit 500 hereinafter. Column ASIL circuit 500 may represent a traditional approach for detecting a failure in an image sensor that feature more than one bitline per column and therefore includes an array of column ASIL circuits 470. Array of column ASIL circuits 470 may include one column ASIL circuit 470(*i*) for each bitline. In the depicted example, column ASIL circuits 470(1) and 470(2) are coupled to bitlines 314 and 312, respectively. Column ASIL circuit 500 also includes an OR gate 519. OR gate 519 has inputs from ASIL_fail nodes 478(1) and 478(2) from column ASIL circuits 470(1) and 470(2), respectively. An output 579 of column ASIL circuit 500 is a result of an OR operation such that when one or both of the column ASIL circuits 470(1) and 470(2) indicate a failure, output 579 also issues a failure flag.

In the depicted example in FIG. 5, each bitline requires a column ASIL circuit 470 for failure detection. Accordingly, for an image sensor with dual bitlines per column, the required space and additional demands for power to accommodate a column ASIL circuit for each bitline are contrary to meet the latest demands for a more compact and less power consuming image sensor. However, example shown in FIG. 6 improves upon the example in FIG. 5 by requiring nearly no additional space and power for failure detection in a dual-bitline per column image sensor.

Figure 6:
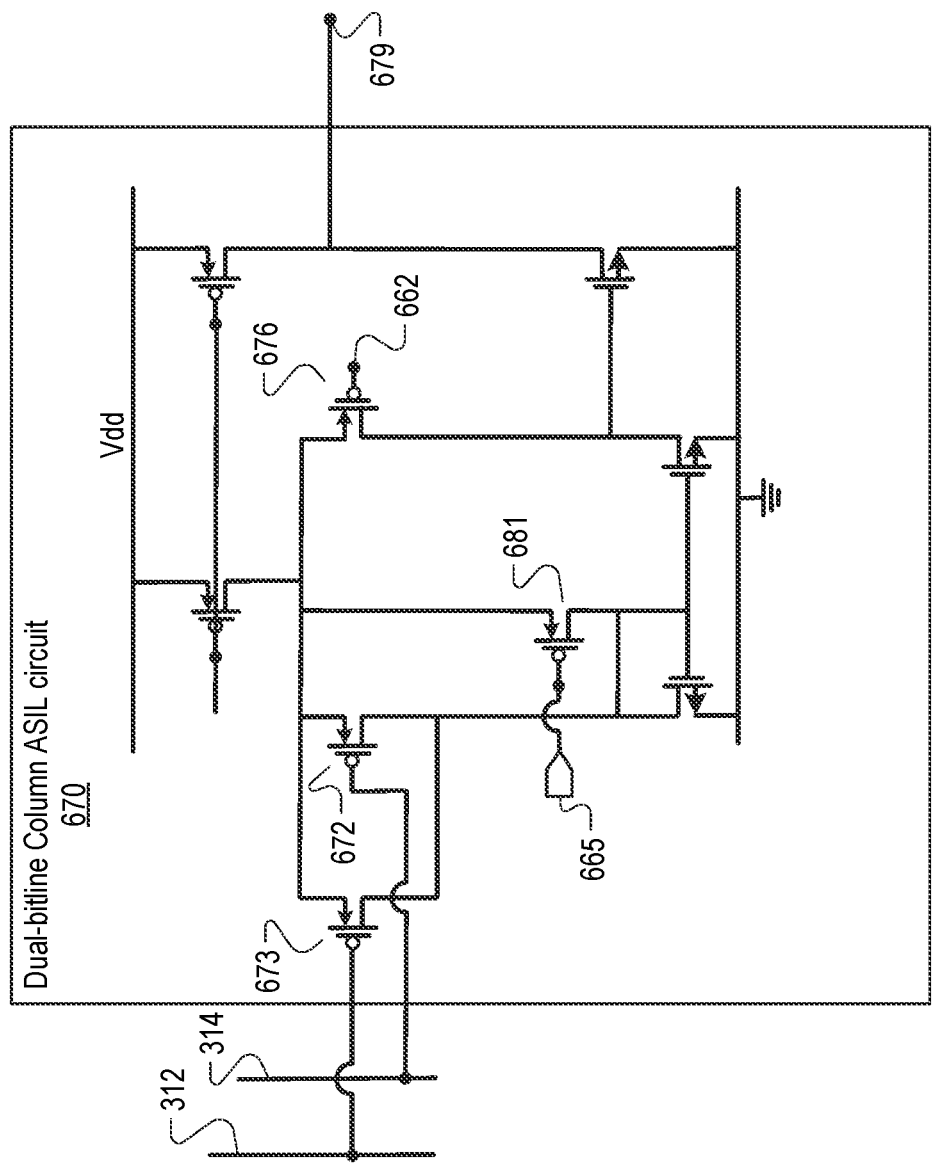
FIG. 6 illustrates a schematic of a dual-bitline failure detection circuit, in an embodiment.

FIG. 6 is an example schematic of a dual-bitline column ASIL circuit 670, column ASIL circuit 670 hereinafter. Column ASIL circuit 670 may be used in an image sensor comprising an array of dual-bitline pixels such as pixel 200 or an array of image sensor columns such as image sensor column 300. Advantageously, Column ASIL circuit 670 may replace two column ASIL circuits 470(1) and 470(2) depicted in FIG. 5. Column ASIL circuit 670 includes a comparator that compares at least two bitline voltages with the reference voltage. For example, a first set of input devices includes an input device 672 coupled to bitline 314 and an input device 673 coupled to bitline 312. A second input device 676 is coupled to a Vref 662, which is an example of Vref 462. Column ASIL circuit 670 also includes an output (ASIL_fail) node 679, which may couple the output of the failure detection circuit to an asynchronous static random-access memory (ASRAM) in a readout circuit such as readout circuit 390 in FIG. 3. In operation, if a failure exists, such as an open connection in either of bitlines 312 and 314 (e.g., disconnection points 317 and 315 or open connection points 316, and 318 in FIG. 3), ASIL_fail node 679 is set high, indicating a failure. As the pixels are read out row-by-row, the physical location of the open connection is unique, and the failed connection location is readily available.

Column ASIL circuit 670 may also include an ASIL test transistor 681, which may be a PMOS transistor, for self-test functionality. For example, self-test functionality performs a check on the functionality of column ASIL circuit 670. In this example, during a self-test, ASIL test transistor 681 is pulled down by a_asil_tst_enb switch 665 to a low position, emulating a failed condition such as a disconnection in a bitline and resulting in ASIL_fail node 679 to be set high.

Combinations of Features

Features described above as well as those claimed below may be combined in various ways without departing from the scope hereof. The following enumerated examples illustrate some possible, non-limiting combinations.

(A1) A failure detection circuit for an image sensor includes a first input node, an array of second input nodes, and an output stage. The first input node is coupled to a reference voltage. The array of second input nodes has each input node coupled to receive a signal from a bitline of a bitline array in an image sensor that includes an array of pixels with each pixel is coupled to at least one bitline of the bitline array. The output stage is coupled to generate an output voltage indicative of any of the second input nodes being lower than the reference voltage.

(A2) In embodiments of failure detection circuit (A1), where each of the array of second input nodes is coupled to a gate of an input transistor, all input transistors of the fault detection circuit have a source tied to a common source node and a drain tied to a common drain node.

(A3) In embodiments of failure detection circuit (A2), there are at least two input transistors, each coupled to a second input node.

(A4) In embodiments of failure detection circuit (A3), there are at least three input transistors, each coupled to a second input node.

(A5) Embodiments of any of failure detection circuits (A2)-(A4) further include a self-test circuit that emulates a failure in the signal from a bitline of the bitline array.

(A6) In embodiments of failure detection circuit (A5), the self-test circuit includes at least one transistor that has a source tied to the common source node and drain tied to the common drain node.

(A7) In embodiments of any of failure detection circuits (A1)-(A6), the bitline array includes at least two bitlines.

(A8) In embodiments of failure detection circuit (A7), the two bitlines include a first bitline coupled to receive a sample and hold reset voltage and a second bitline coupled to receive a sample and hold signal voltage from each pixel of the array of pixels.

(B1) A method for detecting a failure in a bitline includes (i) receiving an array of input voltages with each input voltage received from a respective bitline of a bitline array; (ii) comparing each input voltage of the received array of input voltages with a reference voltage for generating a comparison result; and (iii) outputting a combined result from an OR gate with each input corresponding to the generated comparison result for each input voltage.

(B2) In embodiments of method (B1), in said step of comparing each input voltage, the comparison result is an output voltage indicative of the each input voltage being lower than the reference voltage.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A failure detection circuit for an image sensor, comprising:

a first input node coupled to a reference voltage;

an array of second input nodes, each second input node coupled to receive a signal from a bitline of a bitline array in an image sensor comprising an array of pixels, wherein each pixel is coupled to at least one bitline of the bitline array; and an output stage coupled to generate an output voltage indicative of any of the second input nodes being lower than the reference voltage;

where each second input node of the array of second input nodes is coupled to a gate of an input transistor, all input transistors of the failure detection circuit having a source tied to a common source node and a drain tied to a common drain node; and where the first input node is coupled to a gate of a reference transistor having a source tied to the common source node.

2. The failure detection circuit of claim 1, wherein there are at least two input transistors, each of the input transistors having a gate coupled to a second input node of the array of second input nodes.

3. The failure detection circuit of claim 2, wherein there are at least three input transistors, each coupled to a second input node.

4. The failure detection circuit of claim 1, further comprising a self-test circuit that emulates a failure in the signal from a bitline of the bitline array.

5. The failure detection circuit of claim 4, wherein the self-test circuit comprises at least one transistor having a source tied to the common source node and drain tied to the common drain node.

6. The failure detection circuit of claim 1, wherein the bitline array comprises at least two bitlines.

7. The failure detection circuit of claim 6, wherein the two bitlines comprise a first bitline coupled to receive a sample and hold reset voltage and a second bitline coupled to receive a sample and hold signal voltage from each pixel of the array of pixels.

8. A method for detecting a failure in a bitline, comprising:

receiving an array of input voltages, each input voltage received from a respective bitline of a bitline array;

comparing each input voltage of the received array of input voltages with a reference voltage for generating a comparison result; and outputting a combined result from an OR gate with each input corresponding to the generated comparison result for each input voltage;

the comparing performed in a circuit having, for each input voltage of the array of input voltages, a transistor with a gate coupled to the each input voltage and a source coupled to a common source node, the common source node being coupled to a source of a reference transistor, the reference transistor having a gate coupled to the reference voltage.

9. The method of claim 8, in said step of comparing each input voltage, the comparison result being an output voltage indicative of the each input voltage being lower than the reference voltage.

10. The method of claim 8 wherein there are a plurality of input voltages.

11. The method of claim 8 further comprising simulating a failure in a bitline by applying a voltage to a gate of a test transistor having a source coupled to the common source node.

* * * * *